United States Patent
Jeung (10) Patent No.: US 12,003,200 B2
(45) Date of Patent: Jun. 4, 2024

(54) 4-PHASE SWITCHED RELUCTANCE MOTOR

(71) Applicant: SN INNOVATION CO., LTD., Daejeon (KR)

(72) Inventor: Young Chun Jeung, Daejeon (KR)

(*) Notice: Subject to any disclaimer, the term of this patent is extended or adjusted under 35 U.S.C. 154(b) by 0 days.

(21) Appl. No.: 17/627,648

(22) PCT Filed: Jul. 6, 2020

(86) PCT No.: PCT/KR2020/008815
§ 371 (c)(1),
(2) Date: Jan. 15, 2022

(87) PCT Pub. No.: WO2021/010635
PCT Pub. Date: Jan. 21, 2021

(65) Prior Publication Data
US 2024/0048080 A1    Feb. 8, 2024

(30) Foreign Application Priority Data
Jul. 16, 2019   (KR) .................. 10-2019-0085779

(51) Int. Cl.
*H02P 25/098* (2016.01)
*H02K 11/21* (2016.01)
*H02K 19/10* (2006.01)

(52) U.S. Cl.
CPC ............ *H02P 25/098* (2016.02); *H02K 11/21* (2016.01); *H02K 19/103* (2013.01)

(58) Field of Classification Search
CPC ...... H02P 25/098; H02K 11/21; H02K 19/103
USPC ..................... 318/254.1, 700, 701
See application file for complete search history.

(56) References Cited

U.S. PATENT DOCUMENTS

| | | | |
|---|---|---|---|
| 5,652,493 A | 7/1997 | Hendershot, Jr. | |
| 6,114,789 A | 9/2000 | Pengov et al. | |
| 6,864,658 B1* | 3/2005 | Torrey | H02P 25/0925 318/701 |
| 9,122,252 B2 | 9/2015 | Kimura et al. | |
| 9,391,555 B2* | 7/2016 | Wai | H02P 25/092 |

FOREIGN PATENT DOCUMENTS

| | | |
|---|---|---|
| KR | 200143534 | 6/1999 |
| KR | 10-1999-0064346 | 7/1999 |
| KR | 10-2018-0053498 | 5/2018 |
| KR | 10-1916814 | 11/2018 |

OTHER PUBLICATIONS

English Specification of 10-2018-0053498.
English Specification of KR200143534.
English Specification of 10-1916814.
English Specification of 10-1999-0064346.

* cited by examiner

Primary Examiner — David Luo
(74) Attorney, Agent, or Firm — ANTONIO HA & U.S. PATENT, LLC (57) ABSTRACT

The present invention relates to a 4-phase switched reluctance motor which is configured as a 4-phase motor by coaxially arranging two 2-phase motor units, is capable of effectively driving forward and backward by calculating a switching angle at a time point earlier than the starting point of an inductance increasing period in forward and backward rotations, maximizes the initial driving torque, and minimizes vibration noise by not generating the biased force on a shaft.

7 Claims, 10 Drawing Sheets

4-PHASE SWITCHED RELUCTANCE MOTOR

TECHNICAL FIELD

The present invention relates to a 4-phase switched reluctance motor which is configured as a 4-phase motor by coaxially arranging two 2-phase motor units, may be efficiently driven by computing the switching angle at a time before the start point of an inductance increase interval in each of forward rotation and reverse rotation, and minimizes vibration noise by maximizing the torque at the beginning of startup and causing no force deflected to the shaft.

BACKGROUND ART

A switched reluctance motor (SRM) has coil windings only in the armature, of the rotor and the armature, and provides advantages, such as simplified electromagnetic and mechanical structures, superior durability, high output and high efficiency even without a permanent magnet, and reduced manufacturing costs. However, the SRM is driven with intermittent torque obtained by exciting armature salient poles during an inductance increase interval from the time when a rotator salient pole starts to face an armature salient pole to the time when the rotator salient pole is aligned with the armature salient pole, thus causing severe torque ripples and significant vibration noise as compared with other types of motors and requiring a separate component for addressing the startup failure issue. Thus, SRMs were regarded as appropriate for high speed and low torque, failing to come into commercialization.

Accordingly, the applicant has developed a 2-phase switched reluctance motor which may be driven with continuous torque by axially arranging two single-phase motor units, stably obtain high output event at low speed, enable forward/reverse rotation, and simply escape from startup failure state according to a sensing signal from a sensor used in each of forward and reverse rotations and filed a patent application which was issued as U.S. Pat. No. 10-1916814. The 2-phase switched reluctance motor has been used and sold for fans.

However, each motor unit intermittently generate torque depending on the characteristics of the single-switched reluctance motor. Thus, there have been a need for developing a motor that may continuously generate torque even in each motor unit to thereby increasing the maximum output relative to volume, thereby allowing it to be used for more various purposes.

Further, driving with the maximum efficiency requires calculation of an optimal value for the turn-on leading angle which is the difference between the time when the rotator salient pole and the armature salient pole start to face each other and the time when excitation actually starts. To that end, there has been adopted a scheme to detect and estimate the rotation speed and rotation angle at the time when they start to face each other. However, such scheme was found as having the issue that it is difficult to precisely calculate the optimal turn-on leading angle of each armature salient pole due to a variation in instantaneous rotation speed. Further, as the forward/reverse motor requires an optimal turn-on leading angle in reverse rotation as well as forward rotation, the sensing means for detecting relative positions of the armature salient pole and the rotor salient pole may be complicated.

Further, although such requirements are met, and the issues are addressed, there still exists a need for preventing vibration noise due to asymmetry by giving symmetry to the electromagnetic and mechanical configurations and quickly stabilizing the rotation speed by increasing the torque at the beginning of startup when the instantaneous rotation speed is greatly varied.

PRIOR TECHNICAL DOCUMENTS

Patent Documents (Patent Document 1) KR 10-1916814B1 2018 Nov. 2.

DETAILED DESCRIPTION OF THE INVENTION

Technical Problems

Accordingly, the present invention aims to provide a 4-phase switched reluctance motor that may satisfy all of driving, with high-output forward/reverse rotations and the optimum turn-on leading angle applied, minimizing vibration noise by electromagnetic symmetry and mechanical structure symmetry, and maximizing the torque at the beginning of startup, has a simplified structure, and ensures solidity and durability.

Means to Address the Problems

To achieve the foregoing objects, according to the present invention, a 4-phase switched reluctance motor comprises a shaft 100; a housing 200 partially surrounding and rotatably supporting the shaft 100; two armatures 301 and 302 each including 8n where n is an integer armature salient poles 311, equi-angularly arranged and wound with two different excitation coils 320 so that every other one of the armature salient poles 311 is wound with same one of the excitation coils 320, and a sensors 340 and 341, as a forward rotation sensor and a reverse rotation sensor, installed at two opposite ends, in a circumferential direction, of each of two armature salient poles 311 wound with the different excitation coils 320, the armatures 301 and 302 successively arranged along an axis of the shaft 100 and fixed to the housing 200, respective armature salient poles 311 of the two armatures 301 and 302 arranged at same angles; two rotors 401 and 402 including 4n rotator salient poles 411 provided equi-angularly and having the same arc angle $\beta_r$ as the armature salient poles 311, coaxially fixed to the shaft 100 to have a one-to-one correspondence with the two armatures 301 and 302, wherein a sensor panel 420 being larger than an arc angle $\beta_r$ of the armature salient pole 311 by an angle equal to or smaller than a pole gap $\beta_g$ of the armature salient pole 311 is fixed to be symmetric with respect to a circumferential center of the rotator salient pole 411, and wherein respective rotator salient poles 411 of the two rotors 401 and 402 are arranged to have a difference of 360°/(16n) therebetween; and a controller 500 individually selecting a turn-on angle and dwell angle according to a signal of sensing the sensor panel 420 by a sensor corresponding to a direction to be rotated among the sensors 340 and 341 installed on each of the armature salient poles 311 wound with the four excitation coils 320 and applying, with a time difference, voltage to the four excitation coils 320 to operate as a 4-phase motor.

According to an embodiment of the present invention, the controller 500 excites the armature salient pole, where the sensor panel 420 is detected only by the sensor corresponding to the direction to be rotated among the sensors 340 and 341, at a time of startup and then demagnetizes the armature salient pole at a time of detecting the sensor panel 420 by a sensor corresponding to an opposite direction to the direction to be rotated.

According to an embodiment of the present invention, the armature salient poles 311 wound by the same excitation coil 320 are wound with the excitation coil 320 to alternately exhibit different polarities along the circumferential direction.

According to an embodiment of the present invention, the pole gap $\beta_g$ of the respective armature salient poles 311 of the armatures 301 and 302 is an angle that corresponds to an interval that is less than the arc angle $\beta_r$ of the armature salient pole 311 and is five times, or more, an air gap between the armature salient pole 311 and the rotator salient pole 411.

According to an embodiment of the present invention, the 4-phase switched reluctance motor further comprises a current detector 522 detecting a current flowing through each of the four excitation coils 320. The controller 500 obtains torque generated for each of the four excitation coils 320 from the current and adjusts the turn-on angle or dwell angle of an excitation current for each of the four excitation coils 320 to be uniform.

According to an embodiment of the present invention, the controller 500 includes a forward/reverse input unit 511 to input a rotation direction, a speed input unit 512 to input a rotation speed, and a speed detection circuit 531 obtaining an actually measured rotation speed according signals detected by the sensors 340 and 341 and the controller 500 adjusts the turn-on angle and dwell angle selected according to a sensing signal of a sensor corresponding to the input rotation direction according to the actually measured rotation speed and torque to allow the actually measured rotation speed to follow the input rotation speed.

According to an embodiment of the present invention, the speed detection circuit 531 is configured as an exclusive-OR gate and obtains a rotation speed by receiving sensing signals of sensors corresponding to different rotation directions selected one by one in the two armatures 301 and 302.

Effects of the Invention

According to the present invention configured as above, two 2-phase switched reluctance motor units, each of which includes one armature and one rotor, are prepared and are coaxially arranged to be offset from each other to form a 4-phase motor. The relative positions of the armature salient pole and the rotator salient pole may be detected at a time before the inductance increase interval so that a turn-on angle and dwell angle with an optimal turn-on leading angle may be selected. Thus, it is possible to enhance efficiency in high-speed and low-speed operations both and to calculate an optimal turn-on leading angle even when it does not have an asymmetric structure. Thus, no vibration due to asymmetric salient poles is generated, and an optimal turn-on leading angle may be calculated in forward/reverse operations. Thus, it may be used for various purposes.

According to an embodiment of the present invention, extended sensor plates, a forward rotation sensor, and a reverse rotation sensor are used to allow for an optimal excitation interval where only positive torque may be generated without generating negative torque even at the early stage of startup when it is difficult to select an optimal dwell angle as the rotation speed gradually increases. Thus, it is possible to maximize the torque at the beginning of startup.

According to an embodiment of the present invention, the plurality of armature salient poles simultaneously excited are allowed to be symmetric in polarity. Thus, the length of the magnetic path is minimized, and vibration due to asymmetry of magnetic force lines is not generated.

According to an embodiment of the present invention, the armature salient pole is allowed to have a proper pole gap considering magnetic leakage while continuously generating torque. As the extended length of the sensor panel is determined depending on the pole gap, it is possible to make a design considering all of efficiency, torque density, and turn-on leading angle.

According to an embodiment of the present invention, as per-phase torques are balanced, it is possible to prevent vibration due to imbalance between the per-phase torques.

According to an embodiment of the present invention, it is possible to more rapidly adjust rotation speed by controlling to follow the target rotation speed depending on the actually measured rotation speed and torque. It is possible to more precisely adjust rotation speed by more accurately measuring rotation speed using all of the forward and reverse rotation sensors.

BEST MODE TO PRACTICE THE INVENTION

The terms used herein are defined before describing embodiments of the present invention.

Align refers to a state in which the armature salient pole 311 and the rotator salient pole 411 face each other so that their respective circumferential centers coincide with each other. Unalign refers to a state in which the rotator salient pole 411 is placed in the middle between armature salient poles 311 to be simultaneously excited so as not to radially face the armature salient poles 311.

Dwell angle refers to an excitation interval of the armature salient pole 311, where reluctance torque may be generated by applying electricity to the excitation coil 320 wound on the armature salient pole 311 and is represented as a rotation angle range of the rotator salient pole 411.

Turn-on angle refers to an angle at the time when the dwell angle starts, is represented as a rotation angle of the rotator salient pole 411 at the time of exciting the armature salient pole 311, and may be a firing angle.

Turn-off angle refers to an angle at the time when the dwell angle ends, is represented as a rotation angle of the rotator salient pole 411 at the time when excitation of the armature salient pole 311 ends, and may be an extinction angle.

Inductance increase interval refers to an angle between the time when the rotator salient pole 411 starts to face the armature salient pole 311 to the time immediately before the rotator salient pole 411 is aligned with the armature salient pole 311 and corresponds to a range in which positive torque may be generated by exciting the armature salient pole 311.

Arc angle ($\beta_r$) is an angular representation of the circumferential length of the armature salient pole 311 and the rotator salient pole 411 with respect to the shaft 100 which is the rotation axis.

Pole gap refers to an interval between the armature salient poles 311 equi-angularly arranged around the shaft 100, as the center axis. Air gap refers to an interval between the armature salient pole 311 and the rotator salient pole 411 which face each other.

Hereinafter, preferred embodiments of the present invention are described with reference to the accompanying drawings to be easily practiced by one of ordinary skill in the art.

Figure 1:
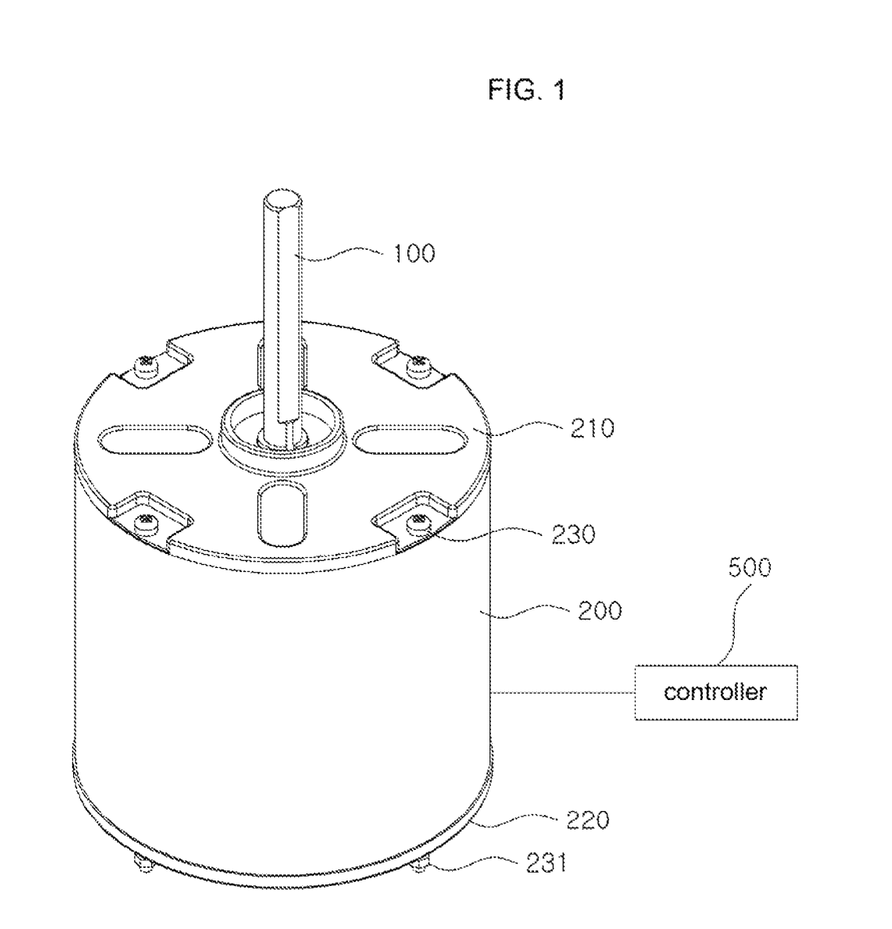
FIG. 1 is a perspective view illustrating a 4-phase switched reluctance motor according to an embodiment of the present invention.

FIG. 1 is a perspective view illustrating a 4-phase switched reluctance motor according to an embodiment of the present invention, showing that a shaft 100 is partially surrounded by a housing 200 whose upper and lower openings are closed by an upper cover 210 and a lower cover 220 so that the rotational force of the shaft 100 may be transferred to the outside through the exposed portion of the shaft 100.

Figure 2:
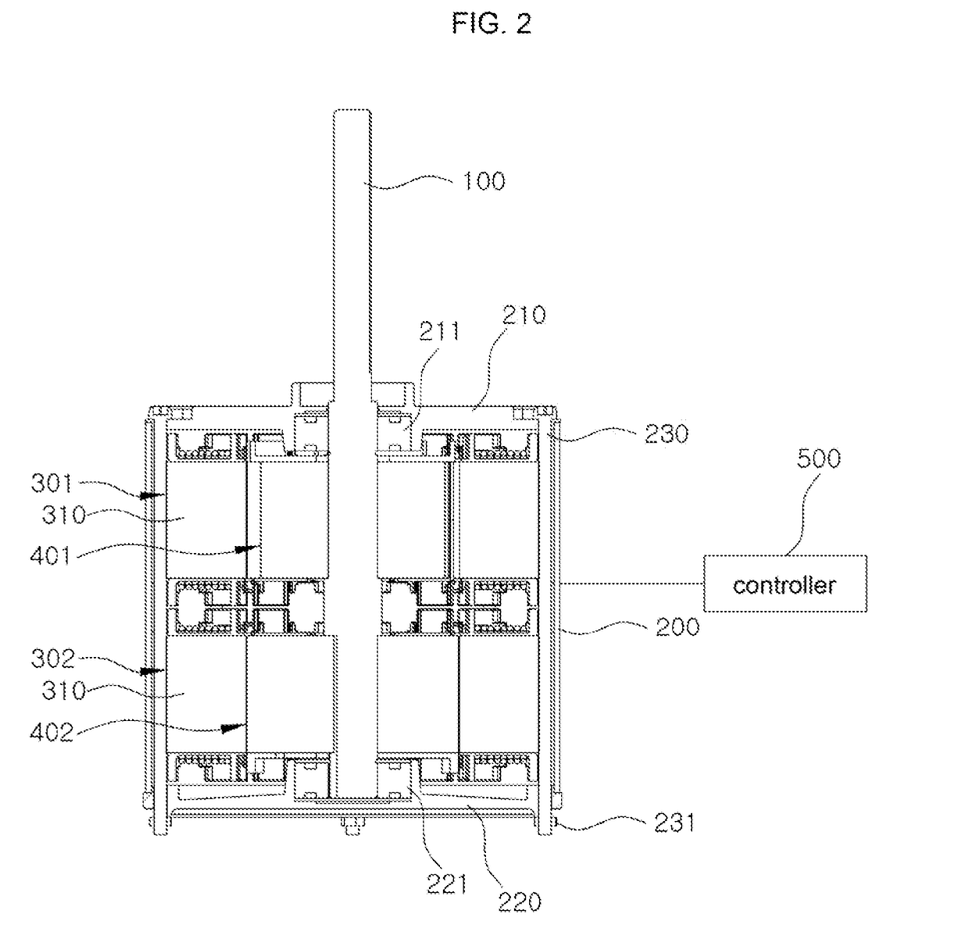
FIG. 2 is a cross-sectional view illustrating a 4-phase switched reluctance motor according to an embodiment of the present invention.

FIG. 2 is a cross-sectional view illustrating a 4-phase switched reluctance motor according to an embodiment of the present invention, showing that the shaft 100 partially received in the housing 200 is rotatable by bearings 211 and 221, and two rotators 401 and 402 fitted and fixed over the shaft 100 are arranged to be surrounded by two armatures 301 and 302, respectively, fixed to the housing 200. In other words, two motor units, each of which includes one rotator 401 or 402 and one armature 301 or 302, are prepared and coaxially installed.

Figure 3:
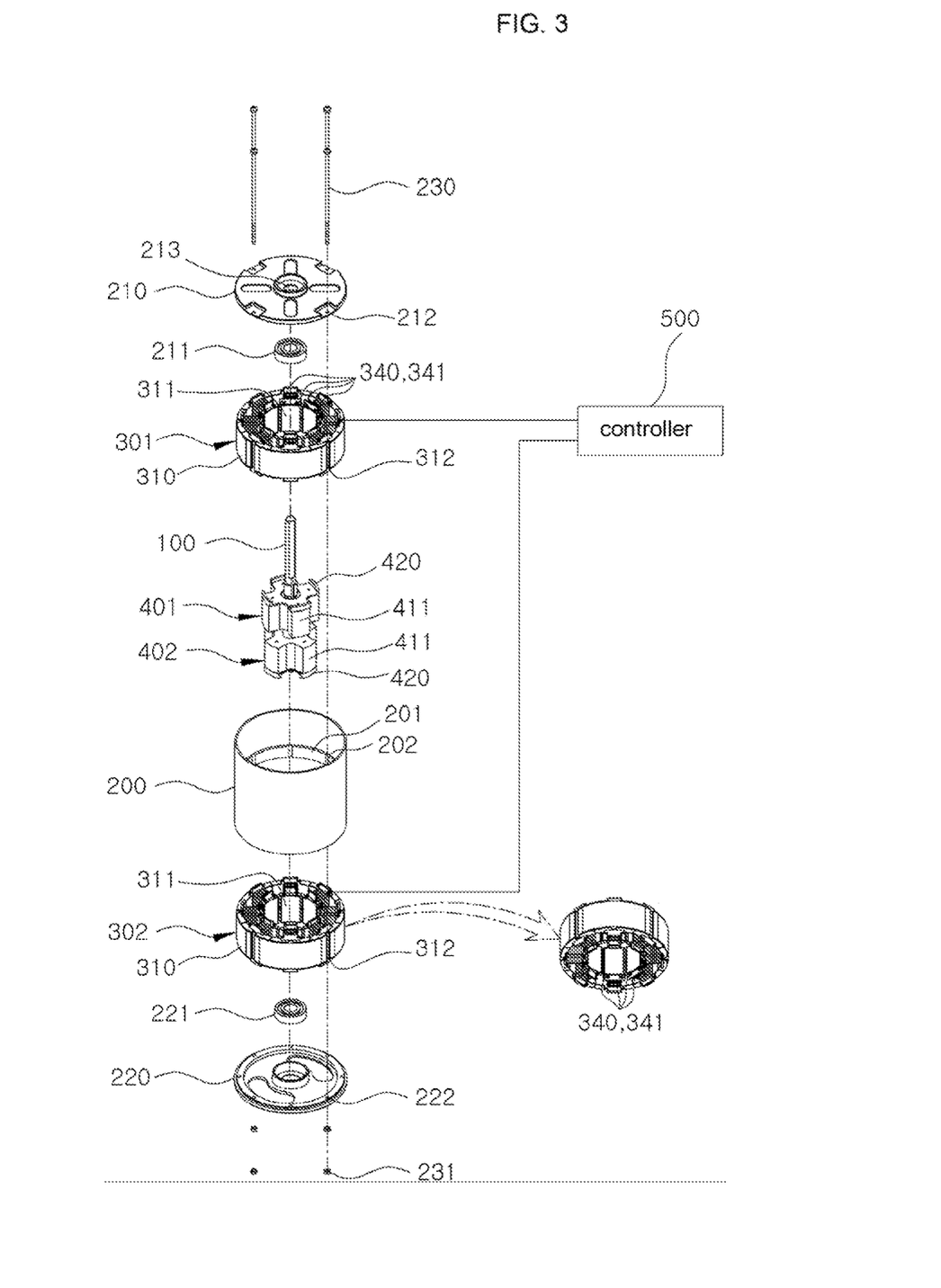
FIG. 3 is a perspective view illustrating assembly of a 4-phase switched reluctance motor according to an embodiment of the present invention.

FIG. 3 is a perspective view illustrating assembly of a 4-phase switched reluctance motor according to an embodiment of the present invention, showing that long bolts 230 are used to fix the two armatures 301 and 302 to the housing 200. FIG. 3 also shows a bottom perspective view of the lower armature 302 of the two armatures 301 and 302 and that the two armatures 301 and 320 have the same configuration.

Referring to FIGS. 1 to 3, according to an embodiment of the present invention, in the 4-phase switched reluctance motor, the two rotors 401 and 402 which are coaxial to the shaft 100 are arranged in one-to-one correspondence to the two armatures 301 and 302 successively arranged along the axial line of the shaft 100 on the inner circumferential surface of the housing 200 and are controlled by the controller 500 electrically connected to the two armatures 301 and 302.

Referring to FIG. 3 which is a perspective view illustrating assembly, the 4-phase switched reluctance motor is assembled by the step of inserting the armatures 301 and 302, one by one, into the housing 200 through the upper and lower openings of the housing 200, the step of inserting the shaft 100, to which the two rotors 401 and 402 are coaxially fixed, so that each of the rotors 401 and 402 is surrounded by a respective corresponding armature 301 or 302, and the step of closing the upper and lower openings of the housing 200 with the upper cover 210 and the lower cover 220.

An annular protrusion 201 is circumferentially formed, midway in the lengthwise direction, on the inner circumferential surface of the housing so that the armatures 301 and 302, inserted one-by-one through the upper and lower openings, are stuck to the protrusion 201 and stay spaced apart from each other by a predetermined interval. The long bolts 230 are passed through coupling holes 212 and 222 respectively formed in the respective edges of the upper cover 210 and the lower cover 220 and are fastened with nuts 231 so that the upper cover 210 and the lower cover 220 are firmly coupled to the housing 200.

The long bolts 230 penetrate along the inner circumferential surface of the housing 200 and sequentially fit into long grooves 312 formed in the outer circumferential surfaces of the armature cores 310 of the armatures 301 and 302 and long grooves 202 formed in the protrusion 201 formed on the inner circumferential surface of the housing 201, firmly fastening the armatures 301 and 302 to the housing 200. Here, instead of the protrusion 110 formed on the inner circumferential surface of the housing 200, a ring-shaped space may be disposed between the two armatures 301 and 302, and the upper cover 210 and the lower cover 220 may be firmly fixed to the housing 200.

The bearing 221 for rotatably supporting a lower end of the shaft 100 is mounted in the center of the lower cover 220, and a shaft through hole 213 through which an upper end of the shaft 100 pass is formed in the center of the upper cover 210. The bearing 211 is mounted to surround the shaft through hole 213. Accordingly, the housing 200 with the upper cover 210 and the lower cover 220 allows the partially surrounded portion of the shaft 100 to pass through the bearings 211 and 221 and allows the shaft 100 to rotate.

Figure 4:
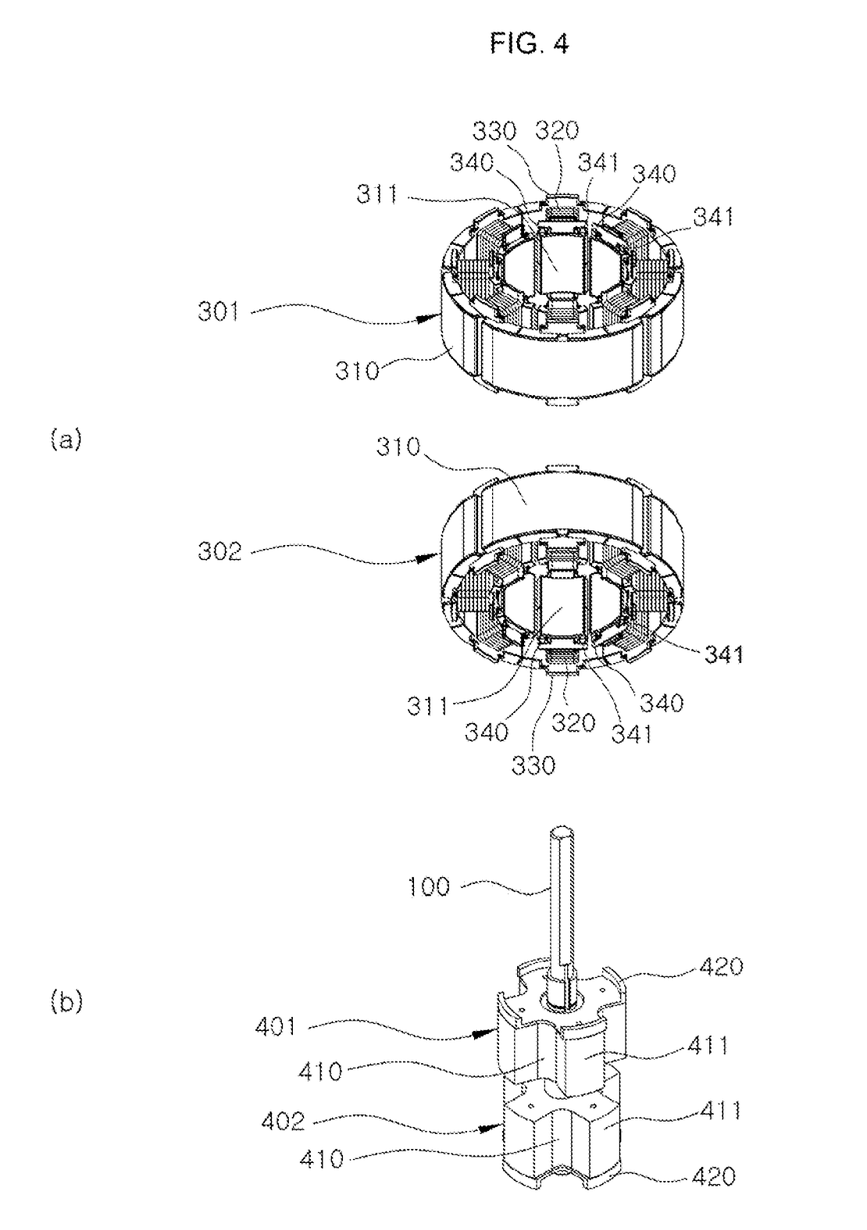
FIG. 4 illustrates perspective views (a) including a top perspective view of an upper armature 301 of two armatures 301 and 302 assembled as shown in FIG. 3 and a bottom perspective view of a lower armature 302 and a top perspective view (b) of a shaft 100 to which two rotators 401 and 402 are fixed.

FIG. 4 illustrates perspective views (a) including a top perspective view of an upper armature 301 of two armatures 301 and 302 assembled as shown in FIG. 3 and a bottom perspective view of a lower armature 302 and a top perspective view (b) of a shaft 100 to which two rotators 401 and 402 are fixed, showing relative positions of the armature salient poles 311 provided in the two armatures 301 and 302 and relative positions of the rotator salient poles 411 provided in the two rotors 401 and 402.

In other words, the armature salient poles 311 of the two armatures 301 and 302, respectively are arranged in a line along the axis of the shaft 100 so as to be arranged at the same angle with respect to the shaft 100, and the rotator salient poles 411 of the two rotors 401 and 402 are arranged with a predetermined angular difference with respect to the shaft 100.

Figure 5:
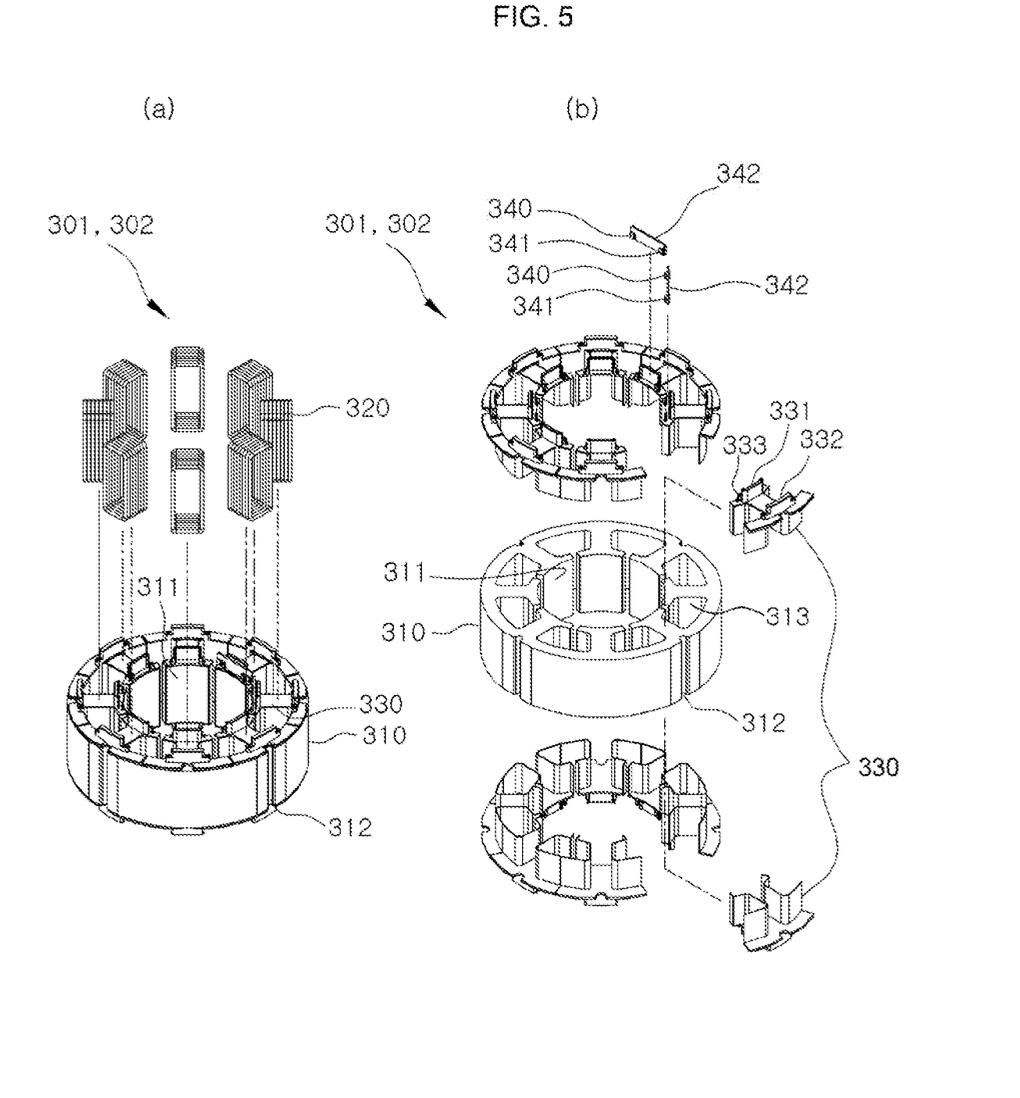
FIG. 5 is a perspective view illustrating assembly of an armature 301 or 302.

FIG. 5 is a perspective view illustrating assembly of an assembly 301 or 302, showing that a forward rotation sensor 340 and a reverse rotation sensor 341 are installed using a sensor circuit board 342.

Figure 6:
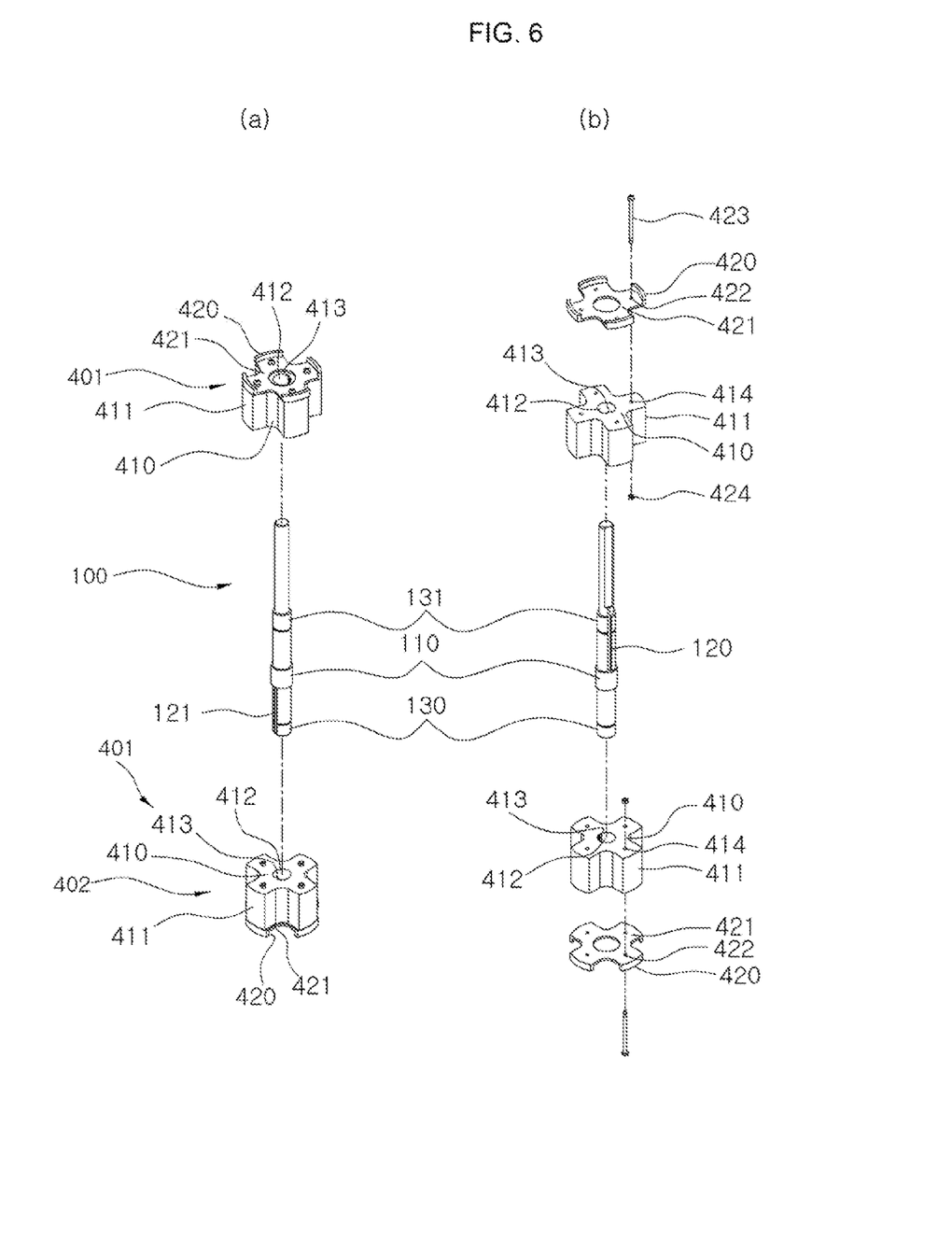
FIG. 6 illustrates a perspective view (a) of assembly of two rotators 401 and 402 and one shaft 100 and a perspective view (b) of assembly thereof at a different angle and a structure for installing sensor panels 420 on rotator salient poles 411 of the rotators 401 and 402.

FIG. 6 illustrates a perspective view (a) of assembly of two rotators 401 and 402 and one shaft 100 and a perspective view (b) of assembly thereof at a different angle and a structure for installing sensor panels 420 on rotator salient poles 411 of the rotators 401 and 402, showing that the two same rotors 401 and 420 manufactured are fitted over the shaft 100, and the sensor panels 420 are installed using the sensor plate 421.

Referring to (a) of FIG. 4 and FIG. 5, two armatures 301 and 302 each includes a cylindrical armature core 310, 8n (where n is an integer) armature salient poles 311 protruding in evenly divided positions circumferentially on the inner circumferential surface of the armature core 310, excitation coils 320 wound on the armature salient poles 311, bobbins 330 covering and electrically insulating the excitation coils 320 of the armature protrusions 311, and sensors 340 and 341 installed at two adjacent armature salient poles 311, respectively. The sensors 340 and 341 are installed at two opposite ends, in the circumferential direction, of each armature salient pole 311, and one of them is used as a forward rotation sensor 340 while the other is used as a reverse rotation sensor 341.

Referring to FIG. 5, the armature salient pole 311 is shaped as the letter "T." A slot 313 is formed between two adjacent armature salient poles 311. The excitation coil 320 is wound on two opposite sides, which faces the slots 313, and the top and bottom, in the axial direction of the shaft 100, of the armature salient pole 311. The bobbins 330 are formed to cover two opposite sides of the armature salient pole 311, facing the slots 313 between the armature salient poles 311, and the upper and lower surfaces, in the axial direction of the shaft 100, of the armature salient pole 311, and include an inner guide wall 331 and an outer guide wall 332 on each of the upper and lower surfaces of the armature salient pole 311, so that the excitation coil 320 passes between the inner guide wall 331 and the outer guide wall 342.

Further, the bobbin 330 also covers the edge of the armature salient pole 311, except to the surface to face the rotator salient pole 411, and protrusions 333 are formed in upper and lower portions covering the edge to face the inner guide wall 331. Upper and lower bobbins 330 which have the same configuration are separately formed and fitted over the armature salient pole 311 downward and upward, respectively.

Among the 8n (where n is an integer) bobbin 330-fitted armature salient poles 311, two adjacent armature salient poles 311 are selected, and the sensor circuit board 342 is installed on each of the bobbins 330 fixed to the two armature salient poles 311. As described below, coils are wound to simultaneously excite every other armature salient pole 311 so that 2-phase winding is adopted. Thus, the sensor circuit board 342 is installed per phase.

The sensor circuit board 342 is inserted and fixed between the protrusions 333 and the inner guide wall 331 and are formed to fit the circumferential length of the armature salient pole 311 or the distance between two opposite ends, in the circumferential direction, of the armature salient pole 311. The sensors 340 and 341 are mounted at two opposite ends of the sensor circuit board 342. The two sensors 340 and 341 are aligned with two opposite ends, in the circumferential direction, of the armature salient pole 311.

The two armatures 301 and 302 assembled as shown in FIG. 5 are received in the housing 200 as shown in FIG. 3 so that the respective armature salient poles 311 of the two armatures 301 and 320 are successively arranged along the axis of the shaft 100. In other words, the upper and lower armature salient poles 311, which are arranged at equal angles with respect to the shaft 100, are arranged equiangularly along the circumferential direction. According to an embodiment of the present invention, the sensors 340 and 341 of the upper armature 301 are rendered to face upward, and the sensors 340 and 341 of the lower armature 302 are rendered to face downward so that the sensors are aligned to the height of the sensor panels 420 of the rotors 401 and 402.

As shown in (b) of FIG. 4 and FIG. 6, the rotor 401 and 402 includes a rotor core 410 having a through hole 412 formed to penetrate the center thereof, 4n (where n is an integer) rotor salient poles 411 protruding in evenly circumferentially divided positions and equi-angularly arranged on the outer circumferential surface of the rotor core 410, and a sensor plate 421 installed to cover one of two opposite surfaces, in the axial direction of the shaft 100, of the rotor core 410 (e.g., upper surface or lower surface of the rotor core 410).

Since the sensor plate 421 includes sensor panels 420 formed to protrude in portions covering the ends of the rotator salient poles 411, if the sensor plate 421 is fixed to the rotor core 410, the sensor panels 420 are disposed to extend from their respective corresponding rotator salient poles 411 along the axial direction.

The so-formed sensor plate is firmly fixed to the rotor core 410 by inserting bolts 423 through through holes 422, formed in the sensor plate 421, and coupling holes 414, formed in the rotor core 410 along the axial direction, and fastening the bolts 423 with nuts 424.

A key 413 protruding long along the axial direction is provided in the shaft through hole 412 to be fitted into the key groove 120 of the shaft 100 to be described below.

The rotors 401 and 402 to which the sensor plates 421 are fixed may have a symmetrical structure with respect to the shaft through holes 412, not to be eccentric during rotation. As such, two rotors 401 and 402 are provided and are fitted over the upper and lower portions, respectively, of the shaft 100.

The shaft 100 has a protrusion 110 on the middle outer circumferential surface of the portion received in the housing 200. The upper and lower portions divided by the protrusion 110 have bearing fit-over portions 130 and 131 that pass through the bearing 211 of the upper cover 210 and the bearing 221 of the lower cover 220 after fitted over by the rotors 401 and 402, and the upper and lower portion of the shaft 100 have key grooves 120 and 121 elongated along the axis.

The two key grooves 120 and 121 formed in the upper and lower portions of the shaft 100 are formed to have an obtuse angular difference with respect to the axis of the shaft 100. The two rotors 401 and 402 formed in the same shape are fitted over downward and upward and stuck by the protrusion 110, and the keys 413 are fitted into the key grooves 120 and 121, so that the respective rotator salient poles 411 of the two rotors 401 and 402 are positioned with a difference of a predetermined angle therebetween with respect to the shaft 100. The predetermined angle is described below with reference to FIG. 7.

The shaft 100 that coaxially fixes the two rotors 401 and 402 is received in the housing 200, in which the two armatures 301 and 302 are fixed to the inner circumferential surface of the housing 20, to be surrounded by the two armatures 301 and 302. Thus, the two rotors 401 and 402 are the two armatures 301 and 302 are arranged in a one-to-one correspondence, forming two motor units each including a rotor and an armature.

The sensors 340 and 341 mounted on two armature salient poles 311 of the upper armature 301 may detect the sensor panels 420 mounted on the rotor salient poles 411 of the upper rotor 401, and the sensors 340 and 341 mounted on two armature salient poles 311 of the lower armature 302 may detect the sensor panels 420 mounted on the rotor salient poles 411 of the lower rotor 402.

The sensors 340 and 341 are sensors that generate different signals when facing the sensor panels 420 and when not facing the sensor panels 420.

Relative positions of the two rotors 401 and 402 and the two armatures 301 and 302 arranged in a one-to-one correspondence as shown in FIGS. 3 to 6 are described below in greater detail.

Figure 7:
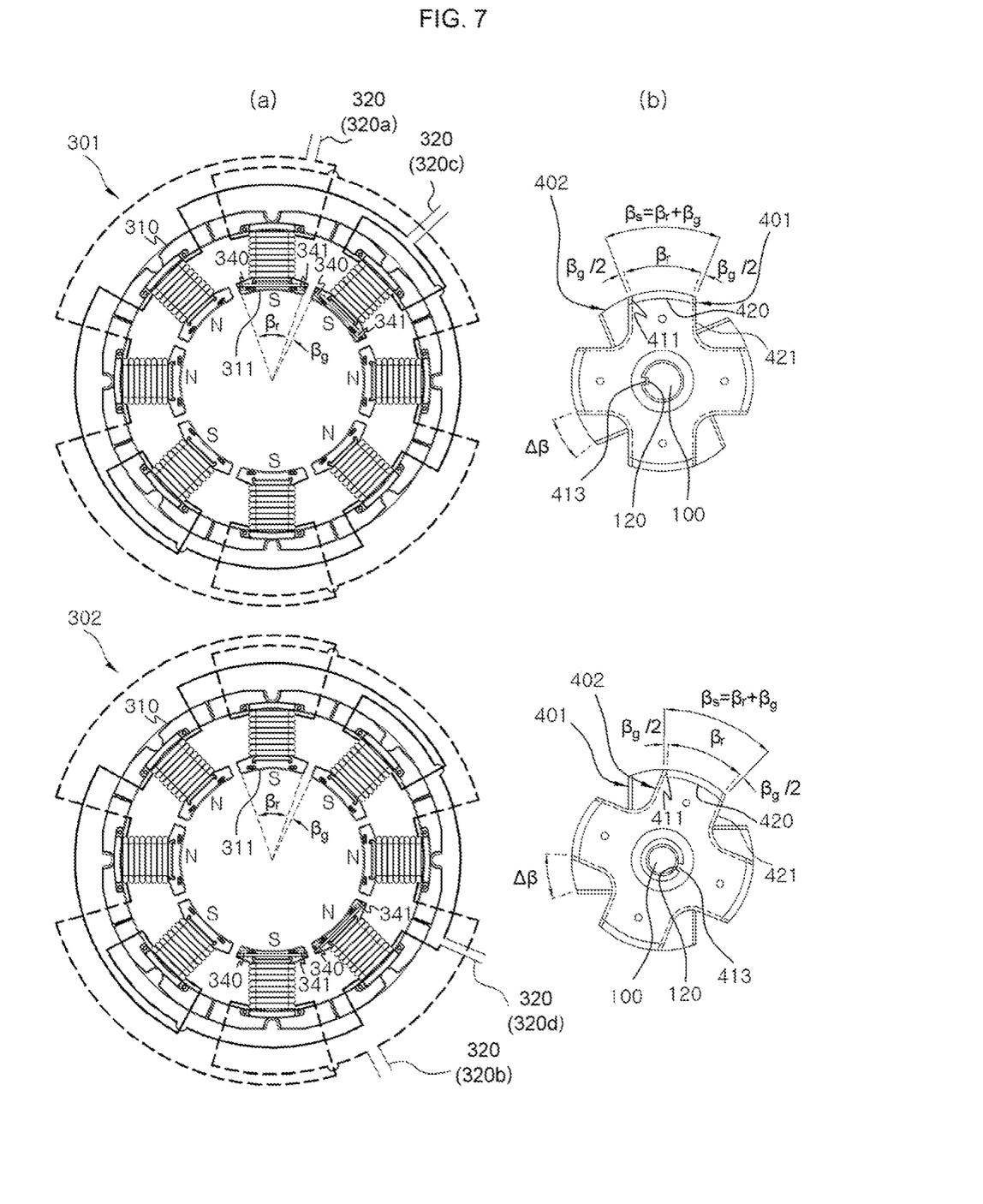
FIG. 7 illustrates views (a) including a top view of an upper armature 301 of two armatures 301 and 302 and a bottom view of a lower armature 302 and top and bottom views (b) of a shaft 100 to which two rotators 401 and 402 are fixed.

FIG. 7 illustrates views (a) including a top view of an upper armature 301 of two armatures 301 and 302 and a bottom view of a lower armature 302 and top and bottom views (b) of a shaft 100 to which two rotors 401 and 402 are fixed.

(a) of FIG. 7 shows that the armatures 301 and 302 are wound with two excitation coils 320a and 320c and 320b and 320d. In other words, the two excitation coils 320a and 320c and 320b and 320d are shown separately in solid lines and dashed lines, and so the armature salient poles 311 wound with the coils are also distinguished.

Although shown to be connected in series for convenience, the same excitation coils 320a and 320b wound on the armature salient poles 311 may also be connected in parallel. 'Same excitation coils' mean coils connected in series or in parallel to each other and capable of simultaneously exciting every other one of the armature salient poles 311 arranged along the circumferential direction.

(b) of FIG. 7 depicts the rotator salient poles 411 covered by the sensor plate 421 in dashed lines, showing relative sizes of the sensor panel 420 and the rotator salient pole 411.

Figure 8:
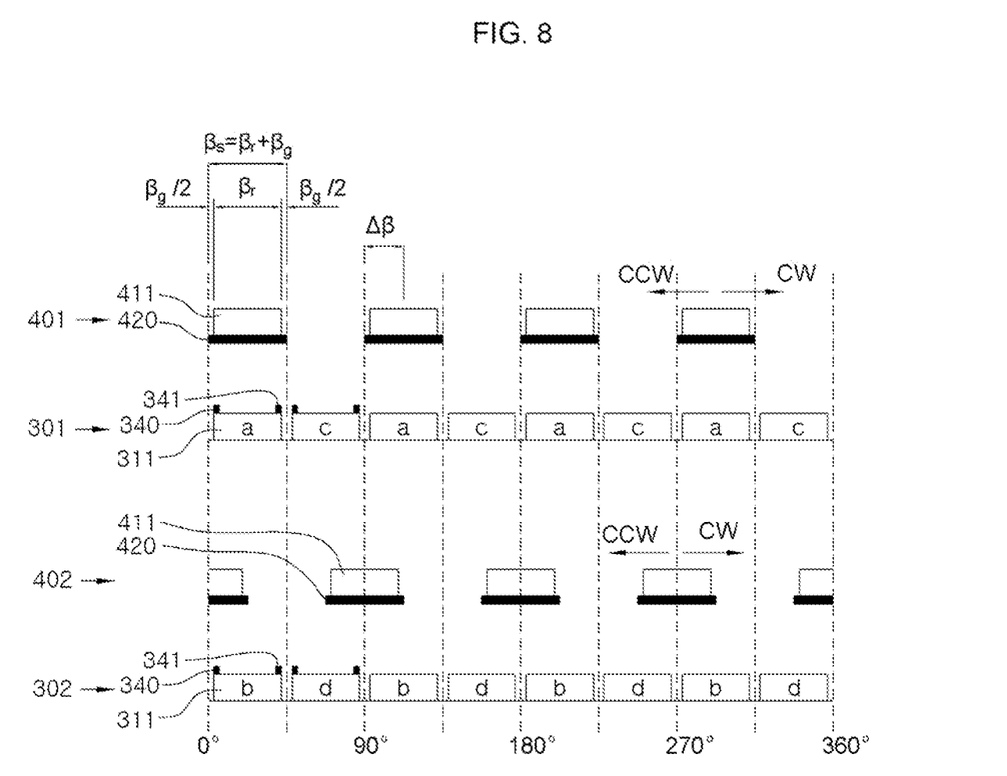
FIG. 8 is a virtual view illustrating relative positions of armatures 301 and 302 and rotors 401 and 402 spread out on a plane.

FIG. 8 is a virtual view illustrating relative positions of armatures 301 and 302 and rotors 401 and 402 spread out on a plane, showing relative positions of sensors 340 and 341 installed at two opposite ends of two armature salient poles 311 of each armature 301 and 302 and sensor panels 420 installed on the rotor salient poles 411 of each rotor 401 and 402 and having a larger arc angle than that of the rotator salient pole 411.

First, referring to (a) of FIG. 7, two armatures 301 and 302 are formed in the same configuration. Specifically, 4n armature salient poles selected every other one from among 8n (where n is an integer) armature salient poles 311 formed on the inner circumferential surface of the armature core 310 are wound with the same continuous excitation coil 320a or 320b and, as flowing current through the excitation coil 320a or 320b, are simultaneously excited. At this time, the 4n armature salient poles which are arranged every other one along the circumferential direction are excited to alternately exhibit N and S poles. In other words, each of the armature salient poles simultaneously excited is excited with an opposite polarity to those of the armature salient poles on two opposite sides thereof in the circumferential direction, so that they form a magnetic circuit. Thus, as the magnetic circuit formed through the rotors 401 and 402 surrounded by the armatures 301 and 302 may be reduced as much as possible, and the magnetic paths are symmetric with respect to the shaft 100, eccentric force is not applied to the rotors 401 and 402 with the result that no vibration due to asymmetry occurs.

Likewise, the remaining 4n armature salient poles which are arranged every other one are wound with the same excitation coil 320c or 320d and are simultaneously excited to exhibit alternate polarities along the circumferential direction.

As excitation current is flowed with an interval of an electrical angle of 90 degrees by the controller 500 to the four excitation coils 320 (320a, 320b, 320c, and 320d) two of which are wound on the upper armature 301 and the other two on the lower armature 302, they are separately denoted as an a-phase excitation coil 320a, a b-phase excitation coil 320b, a c-phase excitation coil 320c, and a d-phase excitation coil 320d.

In other words, the a-phase excitation coil 320a and the c-phase excitation coil 320c are wound on the upper armature 301, and the b-phase excitation coil 320b and a d-phase excitation coil 320d are wound on the lower armature 302.

Further, for convenience, the armature salient poles 311 are also separately denoted as an a-phase armature salient pole, a b-phase armature salient pole, a c-phase armature salient pole, and a d-phase armature salient pole, as depicted in FIG. 8.

Meanwhile, the pole gap $\beta_g$ between the armature salient poles 311 is rendered to be relatively very small as compared with the arc angle $\beta_r$ of the armature salient pole 311 to maximize the dwell angle at which torque may be created. In this case, since the pole gap $\beta_g$ is sufficient as long as it may sufficiently reduce the magnetic flux leaking through the air between the adjacent armature salient poles 311, it is preferable that pole gap $\beta_g$ is relatively very smaller than the air gap between the armature salient pole 311 and the rotor salient pole 411. The pole gap $\beta_g$ is the arc angle $\beta_r$ of the armature salient pole 311, and the smaller it is, the better.

In an embodiment of the present invention, the pole gap $\beta_g$ is smaller than the arc angle $\beta_r$ of the armature salient pole 311 and, considering the amount of magnetic leakage, the pole gap $\beta_g$ is at least 5 times the air gap between the armature salient pole 311 and the rotor salient pole 411.

Next, referring to (b) of FIG. 7, the number of rotor salient poles 411 of the two rotors 401 and 402 is half of the number of armature salient poles 311 of the armatures 301 and 302, and the rotor salient poles 411 have the same arc angle $\beta_r$ as the armature salient pole 311.

To configure a 4-phase motor, the respective rotor salient poles 411 of the two rotors 401 and 402 are arranged to have a predetermined angular difference $\Delta\beta$ therebetween. Since one armature 301 or 302 has 8n (where n is an integer) armature salient poles 311, the predetermined angular difference $\Delta\beta$ is $$\frac{360°}{16m}.$$

Accordingly, the two key grooves 120 and 121 formed in the shaft 100 are formed to have a difference therebetween by an obtuse angle calculated as $$180° - \frac{360°}{16m}.$$

As shown in the drawings, if each armature 301 and 302 have eight armature salient poles 311, the angular difference $\Delta\beta$ between the armatures 301 and 302 is 22.5°.

Each of the sensor panels 420 installed one by one per rotor salient pole 411 is formed of an arc plate having a larger arc angle than the arc angle $\beta_r$ of the rotator salient pole 411 by an angle equal to or smaller than the pole gap $\beta_g$, and is centered on the circumferential center of the rotator salient pole 411 to be symmetric along the circumferential direction of the rotator salient pole 411. In other words, the arc angle $\beta_s$ of the sensor panel 420 has a size that exceeds zero and is the sum of the arc angle $\beta_r$ and an angle selected from a range equal to or smaller than the arc gap $\beta_g$.

The figure for describing the embodiment shows that the arc angle of the sensor panel 420 is maximized as $\beta_s=\beta_r+\beta_g$.

In other words, the sensor panel 420 is shaped to extend circumferentially from each of two opposite ends of the rotator salient pole 411 by a half of the arc gap $\beta_g$.

Accordingly, as shown in FIG. 8, in the upper armature 301, the a-phase armature salient pole and the c-phase armature salient pole are alternately arranged and, in the lower armature 302, the b-phase armature salient pole and the d-phase armature salient pole are alternately arranged, in which the a-phase armature salient pole and the b-phase armature salient pole are arranged at the same angle, and the c-phase armature salient pole and the d-phase armature salient pole are arranged at the same angle.

The forward rotation sensor 340 and the reverse rotation sensor 341 are arranged at two opposite ends of any one of the a-phase armature salient pole, the b-phase armature salient pole, the c-phase armature salient pole, and the d-phase armature salient pole.

The sensor panel 420 disposed on each rotator salient pole 411 is centered on the center of the rotator salient pole 411, at the angle ($\beta_s=\beta_r+\beta_g$) corresponding to the pitch between the adjacent armature salient poles 311.

The rotor salient poles 411 of the upper rotor 401 and the lower rotor 402 are disposed to have the aforementioned angular difference b therebetween.

Accordingly, if excited at the turn-on angle and dwell angle individually selected at the time of detection of the sensor panel 420 by the forward rotation sensor 340 disposed therein for forward rotation (CW), the a-phase armature salient pole, the b-phase armature salient pole, the c-phase armature salient pole, and the d-phase armature salient pole are excited sequentially but with a time difference corresponding the angular difference of electrical angle of 90 degrees, allowing it to operate as a 4-phase motor.

For reverse rotation (CCW), the turn-on angle and dwell angle at the time of detection of the sensor panel 420 by the reverse rotation sensor 341 are selected, and the armature salient pole with the reverse rotation sensor 341 is excited.

Here, since the time of starting detection of the sensor panel 420 by the sensors 340 and 341 comes earlier than the time when the armature salient pole 311 and the rotator salient pole 411 start to face each other (i.e., the start time of the inductance increase interval) by a half of the pole gap $\beta_g$ of the armature salient pole 311, there may be a sufficient time to select the optimal turn-on leading angle.

Specifically, if excited at the time when the rotator salient pole 411 starts to face the armature salient pole 311, the excitation current is gradually increased by the inductance of the excitation coil, so that the torque at the initial stage of excitation is reduced, with the result that the dwell angle needs to be increased to obtain desired torque, and power loss is increased. Thus, it is preferable to select a proper turn-on leading angle, which allows the turn-on angle corresponding to the start time of excitation to come earlier than the time when the rotator salient pole 411 starts to face the armature salient pole 311, considering, e.g., rotation speed or torque.

The present invention makes it possible to select an appropriate turn-on leading angle.

In other words, before the time when the rotator salient pole 411 starts to face the armature salient pole 311, it may be detected in advance, thereby providing a time for selecting an optimal turn-on leading angle. Further, as a turn-on angle and dwell angle with an optimal turn-on leading angle are selected and individual control is performed by detecting a context where each armature salient pole 311 and the rotator salient pole 411 approach each other, it is possible to more precisely control the rotation speed and torque.

The controller 500 is described below.

Figure 9:
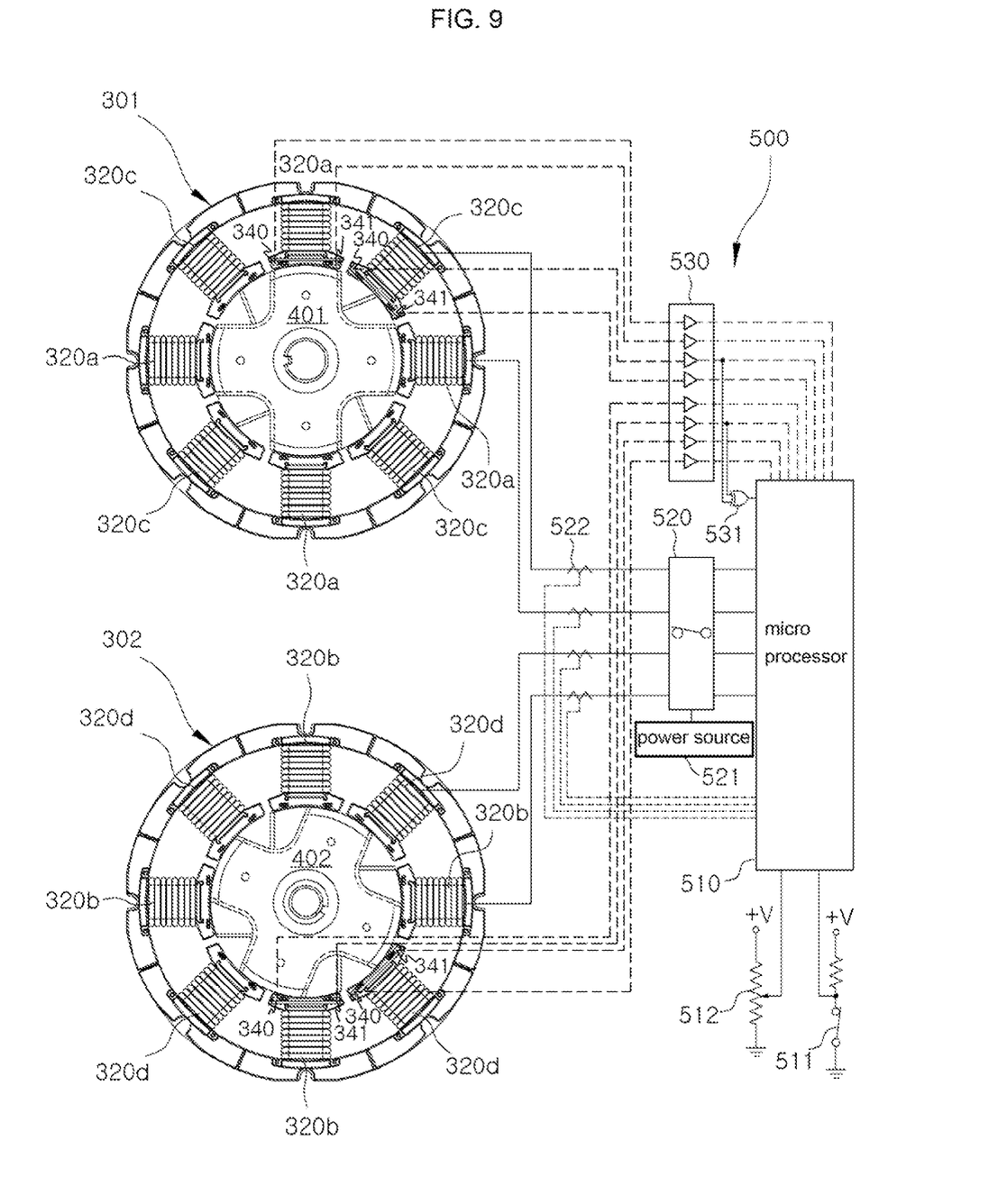
FIG. 9 is a view illustrating a top and bottom of a 4-phase switched reluctance motor, with a housing 200 removed, and a block diagram of a controller 500.

FIG. 9 is a view illustrating a top and bottom of a 4-phase switched reluctance motor, with a housing 200 removed, and a block diagram of a controller 500.

Figure 10:
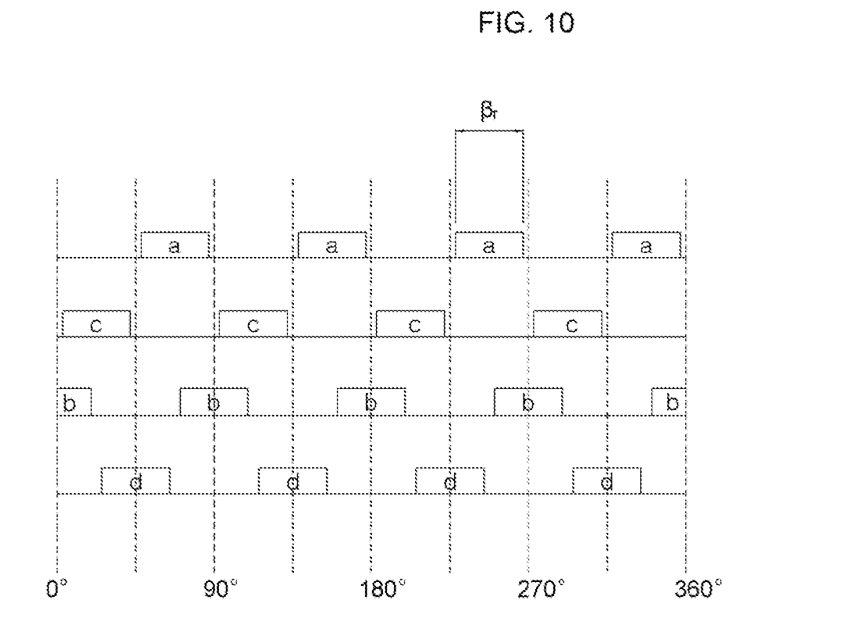
FIG. 10 is a time chart of torque generated according to rotation angles of a shaft 100.

FIG. 10 is a time chart of torque generated according to rotation angles of a shaft 100, when excitation current is flowed for the entire inductance increase interval.

As described above, each of two rotors 401 and 402 have 4n rotator salient poles 411, the respective rotator salient poles 411 of the two rotors 401 and 402 are offset from each other by a difference of 360°/(16n) with respect to the shaft 100, and the sensor panel 420 larger by the pole gap of the armature salient pole 311 is installed on each rotator salient pole 411.

The two armatures 301 and 302 surrounding the two rotors 401 and 402 thusly configured, each, have 8n armature salient poles 311 which are evenly arranged around the shaft 100.

Any one of the plurality of armature salient poles 311 wound with the a-phase excitation coil 320a, any one of the plurality of armature salient poles 311 wound with the b-phase excitation coil 320b, any one of the plurality of armature salient poles 311 wound with the c-phase excitation coil 320c, and any one of the plurality of armature salient poles 311 wound with the d-phase excitation coil 320d have sensors 340 and 341 fixed onto one surface in the axial direction of the shaft, at two opposite circumferential ends thereof. In other words, the forward rotation sensor 340 and the reverse rotation sensor 341 are provided for each phase a, b, c, and d.

The controller 500 are connected to the a-phase, b-phase, c-phase, and d-phase excitation coils 320a, 320b, 320c, and 320d and the sensors 340 and 341 to control the motor to operate as a 4-phase motor.

To that end, the controller 500 includes a power source 521 that receives alternating current (AC) electricity from the outside and converts it into direct current (DC) electricity, a switching circuit 520 that performs switching to supply DC electricity to the a-phase, b-phase, c-phase, and d-phase excitation coils 320a, 320b, 320c, and 320d, a current detector 522 that detects the current supplied to each excitation coil 320a, 320b, 320c, and 320d, a sensor signal input unit 530 that stabilizes the signals detected by the per-phase sensors 340 and 341, a speed detection circuit 531 that receives the detection signals from one forward rotation sensor 340 and one reverse rotation sensor 341 among the per-phase sensors 340 and 341 and detect the forward rotation period and the reverse rotation period, a forward/reverse input unit 511 for selection for operation in forward rotation or operation in reverse rotation, a speed input unit 512 for inputting the rotation speed, and a microprocessor 510 that selects a turn-on angle and dwell angle for each phase depending on the sensing signals from the per-phase sensors 340 and 341, the rotation speed, and the detected excitation current and controls the switching circuit 520 to enable operation according to the rotation direction and rotation speed input by the user.

The switching circuit 520 includes switching elements that individually apply DC voltage to the a-phase, b-phase, c-phase, and d-phase excitation coils 320*a*, 320*b*, 320*c*, and 320*d* so that the microprocessor 510 may individually excite the a-phase, b-phase, c-phase, and d-phase armature salient poles 311.

The DC current detector 522 is a component that detects the current flowing when DC voltage is individually applied to the a-phase, b-phase, c-phase, and d-phase excitation coils 320*a*, 320*b*, 320*c*, and 320*d*. For example, the DC detector 522 may be configured with a current transformer (CT).

The sensor signal input unit 530 is a component that individually stabilizes the sensor signals detected by the per-phase for d rotation sensors 340 and reverse rotation sensors 341 and transfers them to the microprocessor 510. For example, the sensor signal input unit 530 may be configured with a buffer circuit.

The speed detection circuit 531 is a component for measuring the rotation speed of the rotors 401 and 402 coaxially fixed to one shaft 100, and the speed detection circuit 531 receives the sensing signal from a predetermined sensor among the installed sensors 340 and 341 and obtains the period of the electrical angle.

It may be good to obtain the period of the electrical angle by receiving the signal detected by any one of the plurality of sensors, each two of which are installed per phase. However, since an embodiment of the present invention is configured to be able to operate in forward rotation and reverse rotation, an exclusive-OR gate is configured that receives detection signals from one forward rotation sensor 340 and one reverse rotation sensor 341 and produces different outputs depending on whether the input levels are identical.

Further, the reverse rotation sensor installed on any one armature salient pole and the forward rotation sensor installed on another armature salient pole which is excited after 90 degrees compared to the one armature salient pole are rendered to obtain more separate periodic signals and hence rotation speeds through an exclusive-OR gate. For example, as shown in the drawings, the sensing signals from the reverse rotation sensor of the b-phase salient pole and the c-phase forward sensor are input to the exclusive-OR gate, and the rotation speed is obtained with the signal output from the exclusive-OR gate.

The microprocessor 510 selects the turn-on angle and dwell angle of a-phase, b-phase, c-phase, and d-phase capable of operation in the rotation direction and rotation speed received from the forward/reverse input unit 511 and the speed input unit 512 based on the detection signals from the forward rotation sensor 340 and reverse rotation sensor 341 provided for each of the a-phase, b-phase, c-phase, and d-phase, the excitation current for each of the a-phase, b-phase, c-phase, and d-phase, detected by the current detector 522, and the rotation speed actually measured by the speed detection circuit 531 and controls the switching circuit 520 to individually apply voltage to the a-phase, b-phase, c-phase, and d-phase excitation coils 320*a*, 320*b*, 320*c*, and 320*d* according to the selected turn-on angle and dwell angle.

Specifically, since the microprocessor 510 takes, with a time difference, the detection signals from the per-phase sensors corresponding to the rotation direction received by the forward/reverse input unit 511 among the sensor signals received from the sensor signal input unit 530, the microprocessor 510 selects the turn-on angle and dwell angle for operating at the rotation speed received from the speed input unit 512, for each of the a-phase, b-phase, c-phase, and d-phase excitation coils 320*a*, 320*b*, 320*c*, and 320*d*, and individually applies voltage, with a time difference, to the a-phase, b-phase, c-phase, and d-phase excitation coils 320*a*, 320*b*, 320*c*, and 320*d* according to the selected turn-on angle and dwell angle.

Accordingly, as shown in FIG. 10, the torque by the a-phase, b-phase, c-phase, and d-phase is sequentially generated with a difference of 90 degrees, and per-phase torque generation intervals have an overlapping interval, so that it is operated as a 4-phase motor that generates continuous torque.

As described above, the sensors 340 and 341 are arranged at two opposite ends, in the circumferential direction, of the armature salient pole 311, and the sensor panel 420 is configured with a larger arc angle than that of the rotator salient pole 411 which has the same arc angle as the armature salient pole 311 so that the sensor panel 420 is detected by the sensors 340 and 341 earlier than the time when the rotator salient pole 411 starts to face the armature salient pole 311 (i.e., the start time of the inductance increase interval where positive torque may be generated). Accordingly, it is possible to secure a sufficient time for computing an optimal turn-on leading angle and to precisely obtain a turn-on angle and dwell angle at which efficient driving is possible. In other words, although the rotation speed has a slight difference at each moment, since the turn-on angle and dwell angle is obtained in the rotation position obtained at the time when each armature salient pole 311 should be excited, it is possible to drive at the turn-on angle and dwell angle precisely obtained.

Since FIG. 10 shows an embodiment in which two 8-pole armatures 301 and 302 and 4-rotors 401 and 402 are applied, the electrical angle of 90 degrees becomes the mechanical angle of 22.5 degrees. Further, since FIG. 10 shows an example in which a dwell angle is selected to generate torque in the inductance increase interval, the torque generation interval for each phase is represented as the arc angle $\beta_r$ of the armature salient pole 311. However, the dwell angle may be adjusted to be smaller than the arc angle $\beta_r$.

Further, the microprocessor 510 controls to allow the actually measured rotation speed to follow the input rotation speed by applying an adaptive algorithm that adds or subtracts the turn-on angle and dwell angle depending on the actually measured rotation speed obtained through the speed detection circuit 531 or the per-phase torque obtained according to the per-phase excitation current detected through the current detector 522.

Here, the per-phase torque is obtained by taking the excitation current of the inductance increase interval where positive torque is generated among the currents detected for each of the a-phase, b-phase, c-phase, and d-phase.

Further, according to an embodiment of the present invention, the per-phase turn-on angles or dwell angles are adjusted to allow the per-phase torques to be equal so as to balance the per-phase torques.

In practice, it is difficult to wind with the a-phase, b-phase, c-phase, and d-phase excitation coils 320*a*, 320*b*, 320*c*, and 320*d* to have the same reactance and to make the same windings around the armature salient poles 311. Thus, although the same magnitude of excitation current is flowed for each of the a-phase, b-phase, c-phase, and d-phase, the per-phase torques are generated which are not the same. Accordingly, the torque generated for each of the a-phase, b-phase, c-phase, and d-phase excitation coils 320*a*, 320*b*, 320*c*, and 320*d* are not uniform, causing an increase in torque ripples, motor vibration, and noise.

Thus, the present invention adjusts the per-phase turn-on angles or dwell angles so that the per-phase torques obtained from the a-phase, b-phase, c-phase, and d-phase excitation currents become identical. In other words, the per-phase torques are rendered to be uniform while the whole torque is maintained by individually adding and subtracting the per-phase turn-on angles or dwell angles selected for rotation at the input rotation speed.

Meanwhile, the microprocessor 510 excites the armature salient poles which belong to the inductance increase interval by using all of the forward rotation sensor 340 and the reverse rotation sensor 341 when started up in the stopped state of the shaft 100.

In other words, or the armature salient pole 311 of the phase to be excited among the a-phase, b-phase, c-phase, and d-phase armature salient poles 311, the sensor panel 420 is detected only by the sensor corresponding to the direction to be rotated among the forward rotation sensor and the reverse rotation sensor installed. Voltage is applied to the excitation coil 320 wound on the selected armature salient pole 311 and, if the sensor panel 420 is later detected by the sensor corresponding to the opposite direction, the voltage application is stopped to demagnetize the corresponding armature salient pole 311.

In this case, the time of demagnetization is a time when the forward rotation sensor and reverse rotation sensor all detect the sensor panel 420 and is a time prior to the time when the rotator salient pole 411 is aligned to the armature salient pole 311. Accordingly, even in a context where upon startup, the rotation speed gradually increases so that it is difficult to select the time of demagnetization according to the rotation speed, it is possible to generate positive torque while preventing reverse torque by exciting only within the inductance increase interval.

Forward rotation is described as an example. The armature salient pole 311, which is faced and sensed only by the forward rotation sensor 340 of the forward rotation sensor 340 and the reverse rotation sensor 341, is excited, and the excited armature salient pole 311 is later demagnetized when the sensor panel 420 is detected by the reverse rotation sensor 341.

Accordingly, it is possible to maximize torque even at the early stage when rotation speed gradually increases, thus allowing the target rotation speed to be quickly reached.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims. Therefore, such modifications should be regarded as belonging to the scope of the present invention, and the scope of the present invention should be determined by the claims to be described later.

LEGEND OF REFERENCE NUMBERS

100: shaft
110: protrusion 120, 121: key groove
200: housing
201: protrusion 202: long groove
210: upper cover 211: bearing 212: coupling hole
213: shaft through hole
220: lower cover 221: bearing 222: coupling hole
230: long bolt 231: nut
301, 302: armature
310: armature core 311: armature salient pole 312: long groove
313: slot
320, 320a, 320b, 320c, 320d: excitation coil
330: bobbin 331: inner guide wall 332: outer guide wall
333: protrusion
340: forward rotation sensor 341: reverse rotation sensor
342: sensor circuit board
401, 402: rotor
410: rotor core 411: rotor salient pole 412: shaft through hole
413: key 414: coupling hole
420: sensor panel 421: sensor plate 422: bolt through hole
423: bolt 424: nut
500: controller
510: microprocessor 511: forward/reverse input unit 512: speed input unit
520: switching circuit 521: power source 522: current detector
530: sensor signal input unit 531: speed detection circuit

The invention claimed is:

1. A 4-phase switched reluctance motor, comprising:
a shaft;
a housing partially surrounding and rotatably supporting the shaft;
two armatures each including 8n (where n is an integer) armature salient poles, equi-angularly arranged and wound with two different excitation coils so that every other one of the armature salient poles is wound with same one of the excitation coils, and sensors, as a forward rotation sensor and a reverse rotation sensor, installed at two opposite ends, in a circumferential direction, of each of two armature salient poles wound with the different excitation coils, the armatures successively arranged along an axis of the shaft and fixed to the housing, respective armature salient poles of the two armatures arranged at same angles;
two rotors including 4n rotor salient poles provided equi-angularly and having the same arc angle as the armature salient poles, coaxially fixed to the shaft to have a one-to-one correspondence with the two armatures, wherein a sensor panel being larger than an arc angle of the armature salient pole by an angle equal to or smaller than a pole gap of the armature salient pole is fixed to be symmetric with respect to a circumferential center of the rotor salient pole, and wherein respective rotator salient poles of the two rotors are arranged to have a difference of 360°/(16n) therebetween; and
a controller individually selecting a turn-on angle and dwell angle according to a signal of sensing the sensor panel by a sensor corresponding to a direction to be rotated among the sensors installed on each of the armature salient poles wound with the four excitation coils and applying, with a time difference, voltage to the four excitation coils to operate as a 4-phase motor.

2. The 4-phase switched reluctance motor of claim 1, wherein the controller excites the armature salient pole, where the sensor panel is detected only by the sensor corresponding to the direction to be rotated among the sensors, at a time of startup and then demagnetizes the armature salient pole at a time of detecting the sensor panel by a sensor corresponding to an opposite direction to the direction to be rotated.

3. The 4-phase switched reluctance motor of claim 1, wherein the armature salient poles wound by the same excitation coil are wound with the excitation coil to alternately exhibit different polarities along the circumferential direction.

4. The 4-phase switched reluctance motor of claim 1, wherein the pole gap of the respective armature salient poles of the armatures is an angle that corresponds to an interval that is less than the arc angle of the armature salient pole and is five times, or more, an air gap between the armature salient pole and the rotator salient pole.

5. The 4-phase switched reluctance motor of claim 1, further comprising a current detector detecting a current flowing through each of the four excitation coils, wherein the controller obtains torque generated for each of the four excitation coils from the current and adjusts the turn-on angle or dwell angle of an excitation current for each of the four excitation coils to be uniform.

6. The 4-phase switched reluctance motor of claim 5, wherein the controller includes a forward/reverse input unit to input a rotation direction, a speed input unit to input a rotation speed, and a speed detection circuit obtaining an actually measured rotation speed according signals detected by the sensors, and the controller adjusts the turn-on angle and dwell angle selected according to a sensing signal of a sensor corresponding to the input rotation direction according to the actually measured rotation speed and torque to allow the actually measured rotation speed to follow the input rotation speed.

7. The 4-phase switched reluctance motor of claim 6, wherein the speed detection circuit is configured as an exclusive-OR gate and obtains a rotation speed by receiving sensing signals of sensors corresponding to different rotation directions selected one by one in the two armatures.

* * * * *